United States Patent
Antunez

(10) Patent No.: US 10,529,124 B2
(45) Date of Patent: Jan. 7, 2020

(54) METHODS FOR DYNAMIC IMAGE COLOR REMAPPING USING ALPHA BLENDING

(71) Applicant: Google Inc., Mountain View, CA (US)

(72) Inventor: Emilio Antunez, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/699,908

(22) Filed: Sep. 8, 2017

(65) Prior Publication Data

US 2019/0066367 A1 Feb. 28, 2019

Related U.S. Application Data

(60) Provisional application No. 62/550,309, filed on Aug. 25, 2017.

(51) Int. Cl.
*G06T 15/50* (2011.01)
*G06T 19/20* (2011.01)

(52) U.S. Cl.
CPC ............ *G06T 15/503* (2013.01); *G06T 19/20* (2013.01); *G06T 2210/62* (2013.01); *G06T 2219/2012* (2013.01)

(58) Field of Classification Search
None
See application file for complete search history.

(56) References Cited

U.S. PATENT DOCUMENTS

| | | | |
|---|---|---|---|
| 6,038,031 A * | 3/2000 | Murphy | G06T 5/20 345/582 |
| 2008/0101691 A1* | 5/2008 | Ameline | G06T 11/001 382/162 |
| 2016/0133046 A1 | 5/2016 | Tokumoto | |
| 2016/0189421 A1* | 6/2016 | Haimovitch-Yogev | H04N 5/247 345/626 |

OTHER PUBLICATIONS

Notification of Transmittal of the International Search Report and the Written Opinion of the International Searching Authority, or the Declaration, PCT/IB 2018/054442, Oct. 8, 2018.

(Continued)

*Primary Examiner* — Xiao M Wu
*Assistant Examiner* — Steven Z Elbinger
(74) *Attorney, Agent, or Firm* — Foley & Lardner LLP

(57) ABSTRACT

Systems, methods, and computer-readable storage media can be used to perform alpha-projection. One method may include receiving an image from a system storing one or more images. The method may further include alpha-projecting the received image to assign alpha channel values to the received image by projecting one or more pixels of the received image from an original color to a second color and setting alpha channel values for the one or more pixels by determining the alpha channel value that causes each second color alpha blended with a projection origin color to be the original color. The method may further include displaying the alpha-projected image as a foreground image over a background image.

20 Claims, 10 Drawing Sheets
(5 of 10 Drawing Sheet(s) Filed in Color)

(56) References Cited

OTHER PUBLICATIONS

Thomas Porter et al: "Compositing digital images", Computer Graphics, ACM, US, vol. 18, No. 3, Jan. 1, 1984 (Jan. 1, 1984), pp. 253-259, XP058176495, ISSN: 0097-8390, DOI: 10.1145/964965.808606.
Tomas Akenine-Moller et al: "Real-time Rendering, Visual Appearance, Texturing, Advanced Lighting and Shading", Jan. 1, 2002 (Jan. 1, 2002), Real-Time Rendering, 2nd Edition, AK Peters, Natick, Mass, pp. 101-106, 148, XP002512379, ISBN: 978-56881-182-6.
Foreign Action other than Search Report on PCT PCT/IB2018/054442 dated Jun. 11, 2019.
Thomas Porter et al: "Compositing digital images", Computer Graphics, ACM, US, vol. 18, No. 3, Jan. 1, 1984, pp. 253-259.
Tomas Akenine-Moller et al: "Real-time Rendering, Visual Appearance, Texturing, Advanced Lighting and Shading", Jan. 1, 2002, Real-Time Renderng, 2ND Edition, Ak Peters, Natick, Mass, pp. 101-106, 148.

\* cited by examiner

METHODS FOR DYNAMIC IMAGE COLOR REMAPPING USING ALPHA BLENDING

CROSS-REFERENCE TO RELATED APPLICATIONS

This application claims the benefit of and priority to U.S. Provisional Patent Application No. 62/550,309 filed Aug. 25, 2017, the entirety of which is incorporated by reference herein.

BACKGROUND

Alpha-blending is a method by which a first image, a foreground image, is blended with a second image, a background image. The degree by which the background image "bleeds" through the foreground image is based on alpha channel values for the pixels of the foreground image. The alpha channel value of each pixel may be a numeric value which defines the translucency of the pixel. For example, an alpha channel value of zero may indicate that the pixel is fully transparent, meaning that the background pixel is fully visible through the fully transparent pixel of the foreground image. A maximum alpha channel value, for example 255 for an alpha channel value that is a unsigned eight bit integer, may mean that the pixel has no transparency, it is fully opaque. A fully opaque pixel, when alpha blended with a background pixel, may result in only the foreground pixel being visible and the background image not "bleeding" through the foreground image. Variations of alpha values may cause either the foreground image or the background image to appear strong, i.e., be more dominant in the blended image.

SUMMARY

One illustrative method for performing alpha-projection includes receiving an image from a system storing one or more images. The method further includes alpha-projecting the received image to assign alpha channel values to the received image by projecting one or more pixels of the received image from an original color to a second color and setting alpha channel values for the one or more pixels by determining the alpha channel value that causes each second color alpha blended with a projection origin color to be the original color. The method further includes displaying the alpha-projected image as a foreground image over a background image.

Some implementations relate to a system with at least on computing device operably coupled to at least one memory. The computing device is configured to receive an image from a system storing one or more images. The computing device is further configured to alpha-project the received image to assign alpha channel values to the received image by projecting one or more pixels of the received image from an original color to a second color and setting alpha channel values for the one or more pixels by determining the alpha channel value that causes each second color alpha blended with a projection origin color to be the original color. The computing device is configured to display the alpha-projected image as a foreground image over a background image.

Some implementations relate to one or more computer-readable storage media having instructions stored thereon. When executed by at least one processor, the operations include receiving an image from a system storing one or more images. The operations further include alpha-projecting the received image to assign alpha channel values to the received image by projecting one or more pixels of the received image from an original color to a second color and setting alpha channel values for the one or more pixels by determining the alpha channel value that causes each second color alpha blended with a projection origin color to be the original color. The operations further include forcing transparency on the alpha-projected image by selecting pixels of the alpha-projected image to force transparency. The operations further include adjusting the alpha channel values for the selected pixels based on a transparency function by adjusting the alpha channel values for the selected pixels based on the transparency function, an input alpha channel values for the selected pixels, and a distance of each of the selected pixels from an edge of the received image. The operations further include displaying the alpha-projected image as a foreground image over a background image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
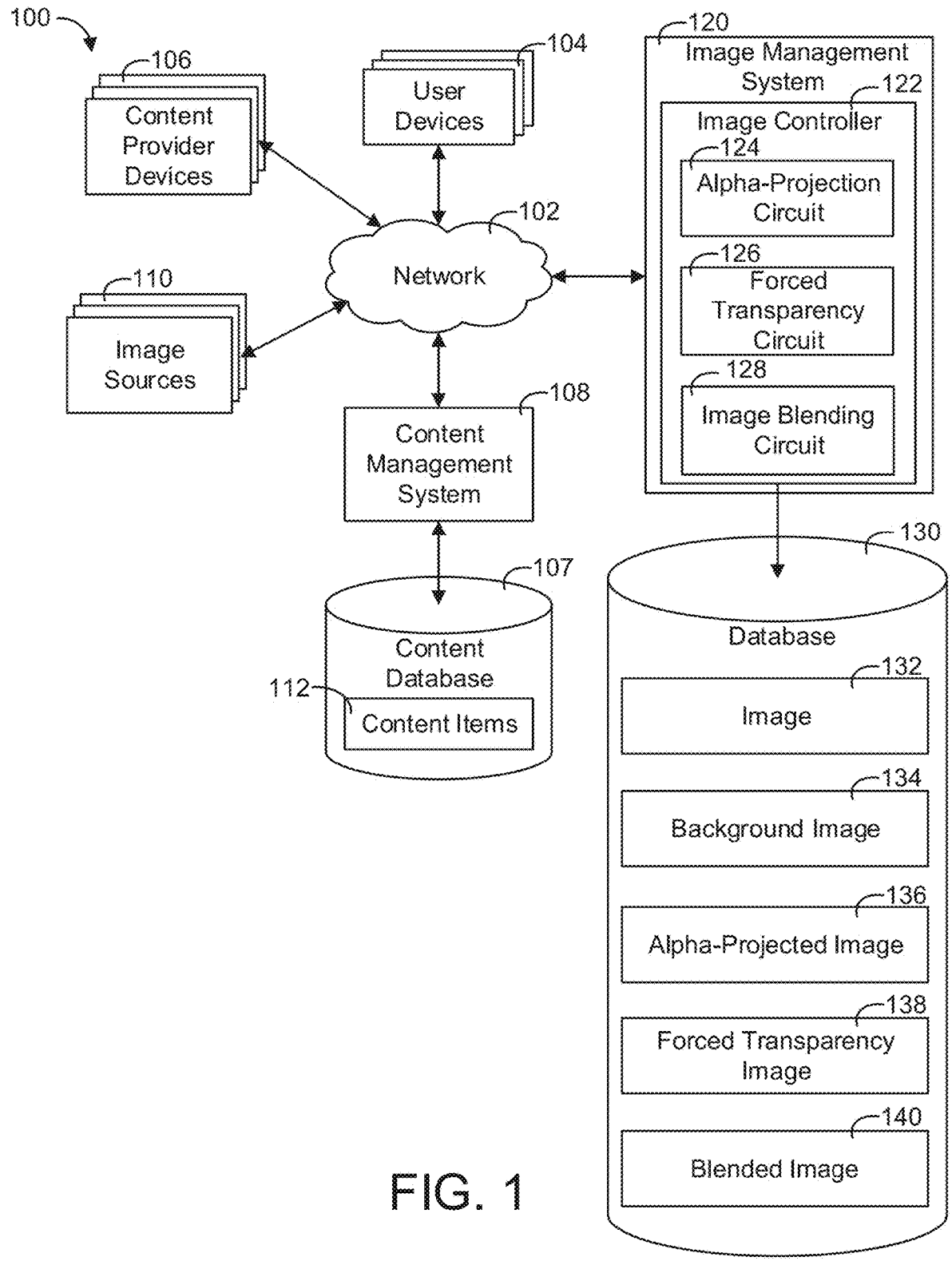
FIG. 1 is a block diagram of an image management system and an associated environment according to an illustrative implementation.

Referring generally to the FIGURES, methods for preparing an image to be blended with a background image are described according to various implementations. In some implementations, methods described herein include a pixel-wise transformation that may have two parts. The first is a red, green, blue, alpha (RGBA) color-space projection which is referred to herein as alpha-projection. The second is correcting alpha channel values that are near the edges of the image, referred to herein as transparency forcing. Alpha-projection can be understood, with reference to the following example. For an RGB color that one may want to make fully transparent, referred to as T, a volume of other colors around it in RGB space can be defined. If an image pixel has a color C belonging to this volume, C is projected linearly away from T onto an RGB color P on the boundary of the volume, a projection surface of the volume. Then, the pixel with color P can be assigned an alpha channel value such that when color P is rendered on top of color T, the alpha-blending formula reconstructs the original RGB color C.

As a result of this transformation, all colors inside the "projected volume" are assigned some transparency, with greater transparency for colors closer to T. If this image is rendered over a background of color T, the alpha-blended result should roughly reconstruct the original image (ignoring small effects from quantization and rounding). As the background color is shifted away from T to another color U, not only do pixels that were originally color T appear as color U, but all colors in the projected volume are smoothly remapped to match.

The second step is a padded edge alpha correction, transparency forcing. Continuing the above example, unless all of the pixels on the edge of the input image have colors very close to T, then they will not be fully transparent. If that is the case and the image has to be rendered with padding from the viewport (either because the image is not large enough to fill the viewport at full resolution, or because the image and viewport aspect ratios do not match), the lack of perfect transparency at the borders of the image can make evident where the image ends and the viewport begins, breaking the illusion of one continuous image that spans the viewport. To avoid this problem, an extra transformation on the alpha channel near those padded edges can be performed, smoothly transforming nearly-transparent pixels into fully transparent pixels at the border. This transparency forcing method may attenuate the effect as one moves away from the image border, so that at some short distance away from the image border, pixels use the transparencies assigned to them by the first stage.

Images showing a central subject (e.g., images of a product, images of a clothing model, etc.) over a solid background are common, since that helps keep the viewer's attention on the subject and the neutral presentation makes it compatible with a number of user interfaces (UIs). However, different UIs might benefit from other versions of said image using different background colors, gradients, and patterns (to contrast or blend in, as desired, with the area on which they are rendered) or padded to different sizes or aspect ratios (so they can completely fill the desired viewport). In some implementations, a different version of the image can be generated for each desired combination of size and background. However, this may present significant use of storage and serving capacity.

One solution may be to transform the image so that the background is transparent. That way, a single version of the image can be stored and served, then rendered over a viewport of the desired background and size to simulate the desired image. However, it may be difficult to generate such transparent-background images since they may require either special setup or tools during image capture, or segmentation of the foreground and background regions in a standard (nontransparent) image using human editing and/or automated methods.

These approaches may be laborious and/or error-prone. The problem becomes even more difficult if one wants to present images generated by others. Transparent-background images are relatively uncommon, making it more likely that one would have to rely on error-prone image segmentation techniques to achieve the desired effect. If the images come from many different sources and are not consistent in their presentation, it can be even harder to create a reliable method that works well under all the possible image and subject variations.

This is one problem faced by shopping websites, which need to be able to present product images from a giant corpus provided by many different merchants. Many of the images that need to be displayed on the shopping websites may be shown on opaque white or very-light-colored backgrounds. New content formats under consideration would benefit from showing those images with a different (e.g. light gray) background color, and with a consistent aspect ratio. It may be beneficial to generate images from the white-background images that the shopping website already has.

During image capturing, methods such as chroma keying (e.g., green screen) and depth-mapping can be used. Chroma keying may capture the image subject in front of a staged background of a known color, then use the presence of that color to detect which pixels belong to the background. The background color must be carefully chosen to not overlap with any colors on the subject otherwise, the color-matching parts of the subject may be misclassified as background.

Further, depth-mapping can be used. Several image-capture setups can capture not only the color of each pixel but also its distance from the camera. If the background is well-separated in distance from the subject, it is possible to isolate the pixels belonging to the subject from those belonging to the background. Depending on the technology used, depth-mapping and chroma-key techniques may require specialized hardware, controlled capture conditions, and restrictions on the subject (e.g. nothing too reflective or with transparent components).

After image capture, image segmentation/matting and uniform image transparency can be used. Image segmentation and matting are areas of ongoing computer-vision research trying to assign pixels to two or more semantically-meaningful regions. "Segmentation" and "matting" are closely related but slightly different concepts, where the former refers to assigning each pixel to exactly one region, and the latter refers to assigning pixels fractional membership in one or more regions (e.g. pixels on an object boundary might be half-background and half-foreground). No technique is perfect, and potential errors include mixing up parts of one region that have similar properties as the other region (e.g. in a white-background image, mislabeling as background any white parts of the foreground). The most robust techniques often have other shortcomings such as slow computation time, the need for large sets of training data, and assumptions on image properties.

One technique for allowing some control over the background color is to assign partial, uniform transparency to all pixels in the image, then render the image over a viewport color that pushes the alpha-blended background color towards the color you want. Though this technique is computationally very lightweight, it has a couple of significant shortcomings: it can substantially reduce image contrast and generally distort perceived colors (e.g. if you want to darken the background, you have to darken the whole image), and you cannot make the image borders entirely transparent, which means it will be obvious if you render an image into a viewport of a different aspect ratio.

Some of the techniques above that involve labeling pixels as foreground or background (i.e. all of them except uniform transparency) have shortcomings that can be overcome with the alpha-projecting and transparency forcing methods described herein. First, by making the background a fully transparent region to be replaced, they are unable to preserve features in the background region (e.g. shadows, reflections, and background textures). Second if one renders the transparent image on a background of similar color as the foreground, it is possible to lose all contrast at the foreground-background boundary.

The methods described herein for alpha-projection and transparency forcing can make near-white pixels transparent, in some implementations. Unlike a uniform transparency method, methods described herein may not attempt to explicitly distinguish between foreground and background. The methods described herein can assign transparency based on input color, giving the transformed image more desirable properties. Because this method makes no attempt to explicitly distinguish between foreground and background, in some implementations, changes in the background color will also affect that color in the foreground, so the technique may work most reliably for modest changes in the background color.

The methods described herein may be advantageous to segmentation based techniques. Though this technique might more often assign some transparency to foreground regions, the visual evidence of these errors after alpha-blending tend to be more subtle, so long as the background color is not changed too drastically. Segmentation errors tend to be more visually obvious, since they can impose transparency changes in the middle of solid regions (where the discontinuity in blended color is very visible), and tend to wipe out all contrast in areas they may mistakenly classify as background. This technique tends to preserve visible contrast in the image, so the foreground will not blend into the background even if the background color is changed to match the original foreground color. This technique can preserve subtle patterns and features in the background, including shadows, reflections, and textures.

The illustrative methods provided herein may have advantages as compared to other color remapping schemes (including uniform transparency), in some implementations. If the original background color is used, the image suffers minimal change in colors and contrast after alpha-blending. Color distortions and contrast loss may be proportional to how much the background color has changed, so for modest changes in background color, there may be no large color distortions. By modulating the size of the projected volume at the point of transformation, one can trade off color preservation (smaller volume) and contrast preservation (larger volume). Regardless of the projected volume chosen, at least half the colors on the border of the RGB cube must be perfectly preserved by this transformation. According to illustrative embodiments, the methods presented herein may assume a single transparent image rendered over an opaque background, but the alpha-blending algorithm may allow one to composite multiple transparent images. One alternative implementation would be to create two or more transparent images which when alpha-blended together result in an image like the one computed directly by this algorithm. That would obviously require storing multiple image files per image to present to a user, but it would result in a similar ability to dynamically recolor the background.

Compared to segmentation/matting techniques that attempt to semantically distinguish the foreground from the background, alpha-white "errors" (assignment of transparency to foreground pixels) are more common, but also more visually subtle. As a result, with the alpha-projection method one can afford to filter less aggressively on images that where one might fail, increasing the number of images with transparent backgrounds.

Visually obvious failure types for segmentation/matting include putting strong alpha transitions in solid color regions, which results in sharp color discontinuities after alpha-blending the image over a non-white background color. The alpha-projection method may only create large variation in alpha across large variations in input color, so changing the background color does not result in similarly obvious discontinuities.

When segmentation/matting misclassify foreground as background, they may set those pixel's alpha to zero, wiping out any RGB contrast in those regions. The alpha-white transform might reduce contrast in those areas, but it won't wipe it out completely.

If two input pixels have nonzero contrast, the same is true in the alpha-blended result. In particular, product shadows cast on the white background are always preserved, and near-white products don't blend completely into the background even as the background is darkened to take on the product's original color. Segmentation and matting are aimed at region classification, and are not designed to guarantee color mappings in their alpha computations.

The transform of the methods described herein, alpha-projection and transparency forcing, is so fast and resource-light that one can compute full-sized thumbnails, which means the results are usable in a wider variety of UIs. Segmentation and matting methods are much slower, and their runtimes generally grow superlinearly in the number of image pixels.

Since the alpha-white algorithm makes no attempt to distinguish white pixels in the background from those belonging to the product, the effect works well in all cases if the viewport color is kept near-white (e.g., down to gray 235). When they work well, segmentation and matting techniques should keep the foreground opaque, allowing much more freedom in the choice of background replacement color (though as noted in the first point, one may need to take care not to match the foreground color).

Another option for dynamic recoloring would be to simply make the whole image uniformly transparent, assigning each pixel some intermediate alpha. This may be fast, but it also distorts colors more overall. In particular, if one use an alpha a a for this simpler transformation, then every alpha-blended color channel is restricted to a range of size a (regardless of the viewport color chosen), resulting in lower contrast across the entire color space. It will also exhibit the same padding discontinuities described as "Padded-Edge Forced Transparency" unless the original image border color exactly matches the viewport color (which may defeat the purpose of adding transparency in the first place).

By contrast, an alpha-projected thumbnail only sacrifices contrast across some colors, and only in proportion to how far the viewport color is from white. If the viewport color is white, alpha-blending should largely reconstruct the original image (except for possibly small distortions from quantization during the transform and during alpha-blending). Regardless of the projection radius and viewport color chosen, alpha-white thumbs may always perfectly preserve (i.e. assign full opacity) to colors that have at least one color channel set to 0. This may include the most saturated versions of all rainbow colors, as well as all colors that can lie between them and black.

Referring now to FIG. 1, a block diagram of an image management system 120 and associated environment 100 is shown according to an illustrative implementation. One or more user devices 104 may be used by a user to perform various actions and/or access various types of content, some of which may be provided over a network 102 (e.g., the Internet, LAN, WAN, etc.). A "user" or "entity" used herein may refer to an individual operating user devices 104, interacting with resources or content items via the user devices 104, etc. The user devices 104 may be used to access websites (e.g., using an internet browser), media files, and/or any other types of content. A content management system 108 may be configured to select content for display to users within resources (e.g., webpages, applications, etc.) and to provide content items to the user devices 104 over the network 102 for display within the resources. The content from which the content management system 108 selects items may be provided by one or more content providers via the network 102 using one or more content provider devices 106.

In some implementations, the content management system 108 may select content items from content providers to be displayed on the user devices 104. In such implementations, the content management system 108 may determine content to be published in one or more content interfaces of resources (e.g., webpages, applications, etc.). The content management system 108 can be configured to conduct a content auction among third-party content providers to determine which third-party content is to be provided to the user device 104. The auction winner can be determined based on bid amounts and a quality score (i.e., a measure of how likely the user of the user device 104 is to click on the content). In some implementations, the content management system 108 allows content providers to create content campaigns. A campaign can include any number of parameters, such as a minimum and maximum bid amount, a target bid amount, and/or one or more budget amounts (e.g., a daily budget, a weekly budget, a total budget, etc.).

The image management system 120 can include one or more processors (e.g., any general purpose or special purpose processor), and can include and/or be operably coupled to one or more transitory and/or non-transitory storage mediums and/or memory devices (e.g., any computer-readable storage media, such as a magnetic storage, optical storage, flash storage, RAM, etc.). In various implementations, the image management system 120 and the content management system 108 can be implemented as separate systems or integrated within a single system (e.g., the content management system 108 can be configured to incorporate some or all of the functions/capabilities of the image management system 120).

The image management system 120 can be communicably and operatively coupled to the database 130. The image management system 120 can be configured to query the database 130 for information and store information in the database 130. In various implementations, the database 130 includes various transitory and/or non-transitory storage mediums. The storage mediums may include but are not limited to magnetic storage, optical storage, flash storage, RAM, etc. The database 130 and/or the image management system 120 can use various APIs to perform database functions (i.e., managing data stored in the database 130). The APIs can be, but are not limited to SQL, ODBC, JDBC, etc.

Image management system 120 can be configured to communicate with any device or system shown in environment 100 via network 102. The image management system 120 can be configured to receive information from the network 102. The information may include browsing histories, cookie logs, television advertising data, printed publication advertising data, radio advertising data, and/or online advertising activity data. The image management system 120 can be configured to receive and/or collect the interactions that the user devices 104 have on the network 102.

Image sources 110 may be systems that generate and/or store images (e.g., image 132). The image controller 122 can receive image 132 from a third party system (e.g., image sources 110). The third party system may be a merchant, a manufacturer, and/or any other entity or system. In some embodiments, the image management system 120 itself generates an image and/or retrieves the image from an image storage system. The image may be an image of a product. In some embodiments, the image may be line art images, e.g., diagrams, maps, cartoons, stock photography that focuses on a particular image subject, etc. The methods described herein can be applied to any type of image.

The image management system 120 can be configured to send information and/or notifications relating to various metrics or processed images to the content provider devices 106. This may allow a user of one of the content provider devices 106 to review the various metrics or images which the image management system 120 determines and/or generates. Further, the image management system 120 can use the various metrics to identify opportune times to make contact with a user or appropriate amounts (e.g., an optimal mixed media spend) to spend on various media channels (e.g., television advertising, Internet advertising, radio advertising, etc.). The image management system 120 can cause a message to be sent to the content management system 108 and/or the content provider devices 106 indicating that the content management system 108 should make contact with a certain user at a certain time and/or a content campaign operate with certain parameters. This may cause the content management system 108 to manage content auctions accordingly and/or identify various system loads.

The image management system 120 may include one or more modules (i.e., computer-readable instructions executable by a processor) and/or circuits (i.e., ASICs, Processor Memory combinations, logic circuits, etc.) configured to perform various functions of the image management system 120. In some implementations, the modules may be or include an image controller 122 which is shown to include an alpha-projection circuit 124, a forced transparency circuit 126, and an image blending circuit 128.

The image controller 122 can be configured to communicate with and/or manage the database 130. The image controller 122 can be configured to store and/or retrieve images and/or any other data from the database 130. The image controller 122 can be configured to receive various images from image sources 110 and store the received images in the database 130. The image sources 110 may be a system (e.g., a server, a user device e.g., user devices 104, an image database, and/or any other computing or storage device) for a merchant, an artist, a photographer, and/or any other entity which may have images. The image controller 122 can be configured to store an image it receives from the image sources 110 as image 132.

The image 132 may be an RGB or RGBA image. The alpha-projection circuit 124 can be configured to perform alpha-projection on the image 132 by creating an alpha value for the pixels of image 132 and/or adjusting an already present alpha channel value for the pixels of image 132. The alpha-projection that alpha-projection circuit 124 can be configured to perform may result in the alpha-projected image 136.

The alpha-projected image 136 may have selected alpha channel values for the pixels of the alpha-projected image 136 due to the alpha-projection performed by the alpha-projection circuit 124. The forced transparency circuit 126 can be configured to generate a forced transparency image 138 based on the alpha-projected image 136. The forced transparency circuit 126 can be configured to adjust the alpha channel values for the pixels of the alpha-projected image 136 with a transparency function and a distance of each pixel from an edge of the alpha-projected image 136. The transparency function may take an input alpha channel value for a pixel of the alpha-projected image 136 and generate an output alpha channel value for the pixel, this may adjust the alpha channel values for the pixels of the alpha-projected image 136.

The image blending circuit 128 can be configured to generate a blended image 140. The blended image 140 may be and/or included in a content item served to user devices 104, a product listing on a shopping website, and/or any other image that is displayed to a user. The image blending circuit 128 can be configured to generate the blended image 140 by displaying the forced transparency image 138 or the alpha-projected image 136 over a background image, background image 134. The background image 134 may be a solid color, e.g., white, a light grey, and/or any other color. In some implementations, the background image 134 may be a pattern or any other type of background image. The image blending circuit 128 can be configured to generate the blended image 140 by alpha-blending the alpha-projected image 136 or the forced transparency image 138 with the background image 134.

In some implementations, the user devices 104 can include the image controller 122 and/or can perform some and/or all of the functionality of the image controller 122. The user devices 104 can include a processing circuit, including one or more processors, one or more memory devices (e.g., RAM, ROM, etc.), and/or any other non-transitory or transitory storage medium. The processing circuit of the user devices 104 can be configured to implement the image controller 122 and/or some of the functionality of the image controller 122. In this regard, some and/or all of the functionality of the image controller 122 can be performed locally by user devices 104 instead of in the cloud e.g., by image management system 120. The user devices 104 may be and/or include an embodiment of the computing system 2200 as described with reference to FIG. 22.

In some implementations, the image management system 120 generates the alpha-projected image 136 and/or the forced transparency image 138. The image management system 120 can be configured to send the alpha-projected image 136 and/or the forced transparency image 138 to the user devices 104 via the network 102. The image management system 120 may send the images to the user devices 104 to be displayed for a content item, in a shopping website interface, and/or as an image on any type of website. The user devices 104 can be configured to perform alpha-blending of the received images (e.g., alpha-projected image 136 and/or the forced transparency image 138) with a background image and/or background color e.g., a viewport, a content item, etc. and/or the background image 134 which may be received from the image management system 120.

As an example, a user device 104 may display a website and/or content item on a website in a browser that is run on the user device 104. The user device 104 may receive the alpha-projected image 136 and/or the forced transparency image 138 from the image controller 122 via the network 102. The images may be received and/or sent to the user devices 104 in response to a web browser of the user devices 104 requesting a webpage and/or images to be displayed in the webpage. The user device 104 can alpha-blend the received transparent images with a background image and/or background color in response to the web browser running on the user device rendering the transparent image onto the webpage displayed in the web browser.

The image controller 122 can be configured to perform alpha-blending to blend images together or perform alpha-projection. Specifically, the alpha-projection circuit 124 can be configured to perform alpha-projection and generate the alpha-projected image 136 by utilizing alpha-blending (e.g., the alpha-blending as defined in Equation 1). Further, the image blending circuit 128 can be configured to generate the blended image 140 by alpha-blending the alpha-projected image 136 or the forced transparency image 138 with the background image 134.

Alpha-blending may be used to render a transparent pixel over another color. For a foreground RGBA color ($F_r$, $F_g$, $F_b$, $F_a$) over an RGB (opaque) background color ($B_r$, $B_g$, $B_b$), the alpha-blended result ($R_r$, $R_g$, $R_b$) may be an RGB-space linear interpolation of the two colors, using $$\frac{Fa}{255}$$

as the weight. For example, the red channel would equal (Equation 1), $$R_r = F_r \frac{Fa}{255} + B_r \left(1 - \frac{Fa}{255}\right)$$

The values for the green and blue channels could be analogous and could be determined with Equation 1. Regarding the methods discussed herein, it may be assumed that a red, green, blue, alpha, (RGBA) representation for transparent colors is used for images. In some implementations, it can also be assumed that each channel value is an 8-bit unsigned integer in the range 0 to 255, inclusive, where alpha 0 represents full transparency and alpha 255 represents full opacity. However, the methods described herein can use other numbering systems (e.g. floating point values in the range [0.0, 1.0]).

The alpha channel can be used for image compositing. It can be used to classify how much of the pixel was occupied by the image subject that determined its color, so for large solid objects, most foreground pixels should be fully opaque and most background pixels should be fully transparent, with intermediate values only at the object borders where a pixel partly overlaps both foreground and background. Transparency can also be used in more creative ways to smoothly blend two images, as in the "image feathering" technique.

Figure 2:
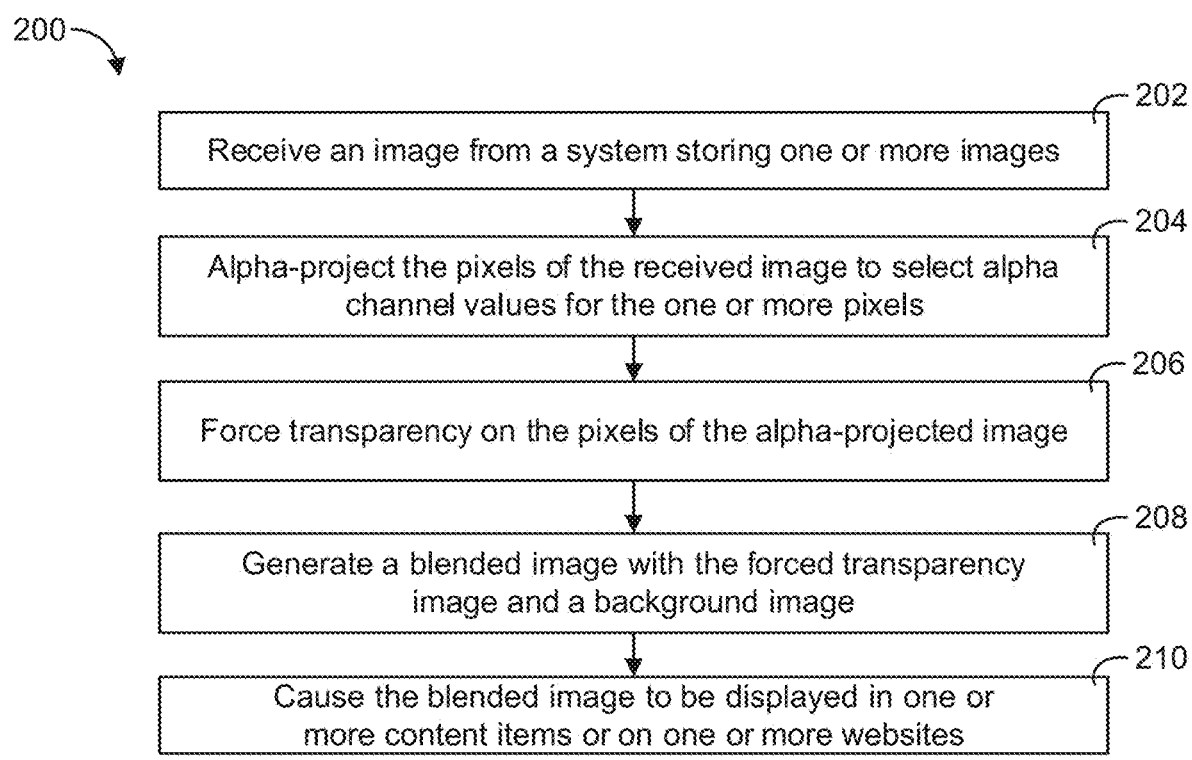
FIG. 2 is a flow chart of a process for alpha-projecting pixels of an image and forcing transparency on the alpha-projected image according to an illustrative implementation.

Referring now to FIG. 2, a process 200 is shown for performing alpha-projection on an image and forcing transparency on the alpha-projected image, according to an illustrative implementation. The image controller 122, specifically the alpha-projection circuit 124, the forced transparency circuit 126, and the image blending circuit 128, can be configured to perform process 200. Further, any computing device described herein can be configured to perform the process 200, for example, the computer system 2200 as described with reference to FIG. 22. The execution of the method described herein, specifically process 300, may be fast and scale linearly with the number of input pixels. Aside from the memory allocated for the output buffer, memory usage may be negligible for the methods described herein.

In step 202, the image controller 122 can be configured to receive an image, image 132, from an image storage system that stores one or more images. In some embodiments, image controller 122 receives the image 132 from a third party system, e.g., image sources 110. In some embodiments, the image controller 122 retrieves the image 132 from the database 130, the user devices 104, and/or the content provider devices 106.

In step 204, the alpha-projection circuit 124 can be configured to alpha-project the received image 132. Alpha-projecting the received image 132 may generate the alpha-projected image 136. If the received image 132 is an RGB image that does not have an alpha channel values, alpha-projecting the image may include determining an alpha channel value of each pixel of the received image 132. If some or all of the pixels of the received image 132 already have an alpha channel value, the alpha-projection circuit 124 can alpha blend any pixels of the received image 132 that have an alpha channel value below full opacity (e.g., 255) with a white background to ensure full opacity on said pixels before performing step 204.

Alpha-projecting the pixels of the image 132 may include defining an RGB color volume with a projection solid i.e., the color volume may be the volume of the projection solid within an RGB cube. Alpha-projecting the image 132 may further include projecting each pixel of the image 132 that is within the defined color volume to a surface of the projection solid and setting an alpha channel value for said pixel such that alpha-blending the projected color with a default color (e.g., with white, a default grey), the original color of the pixel is achieved. The alpha-projection that can be performed by the alpha-projection circuit 124 is described with further detail to process 300 of FIG. 3 and elsewhere herein.

In step 206, the forced transparency circuit 126 can be configured to force transparency on the alpha-projected image 136 generated in the step 204, generating the forced transparency image 138. Forcing transparency on the alpha-projected image 136 may include defining a second RGB color volume with a second projection solid. The pixels of the alpha-projected image 136 that are within the second color volume can be selected by the forced transparency circuit 126.

The selected pixels can have their alpha channel values adjusted by the forced transparency circuit 126 with a forced transparency function. The forced transparency function can define an adjustment to the selected alpha channel values. The forced transparency function may include a forced threshold and a preserved threshold which define which alpha channel values of the selected images are adjusted, and the amount by which they are adjusted. Forcing transparency is described in further detail with reference to process 400 of FIG. 4 and elsewhere herein. The forced transparency function is described with reference to chart 1400 of FIG. 14 and elsewhere herein.

Figure 5:
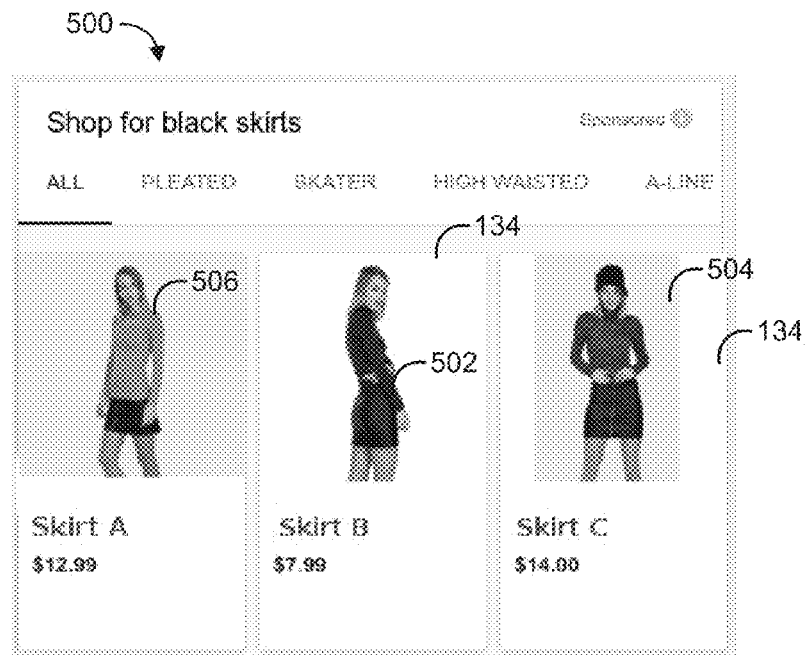
FIG. 5 is an illustration of a content item including multiple product images displayed over a background according to an illustrating implementation.

In step 208, the image blending circuit 128 can be configured to generate a blended image 140 for display in content items, website banners, online shopping interfaces, and/or any other interface. Image blending circuit 128 can be configured to generate the blended image 140 with the forced transparency image 138 (or the alpha-projected image 136) as a foreground image and the background image 134 as a background. Image blending circuit 128 can be configured to generate the blended image 140 by alpha-blending the forced transparency image 138 and the background image 134. In some embodiments, the background image 134 has larger dimensions than the forced transparency image 138 (e.g., as shown in FIG. 5). The image blending circuit 128 can be configured to center the forced transparency image 138 onto the background image 134 before compositing the images.

In step 210, the image controller 122 can be configured to cause the blended image 140 to be displayed in content items or on websites. For example, the blended image 140 can be included in the content items 112 of content database 107.

These content items 112 with the blended image 140 can be served to user devices 104. In some embodiments, the blended image 140 can be displayed in a website such as a shopping website.

Figure 3:
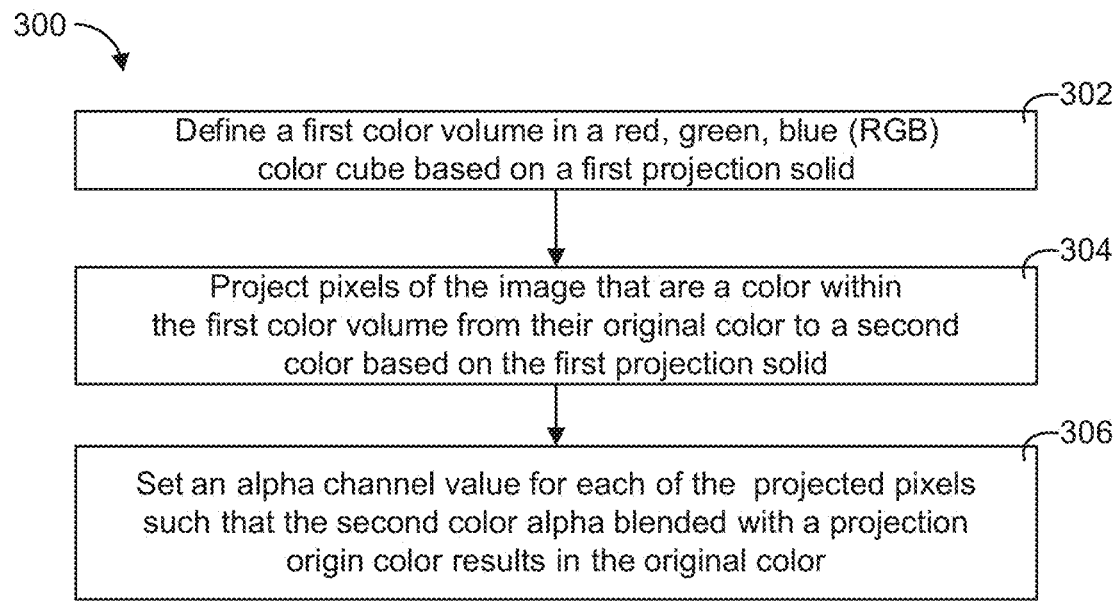
FIG. 3 is a flow chart of the process of performing alpha-projection described in further detail according to an illustrative implementation.

Referring now to FIG. 3, a process 300 is shown illustrating the process of alpha-projection in greater detail, according to an illustrative implementation. Process 300 may be a process for performing step 204 of process 200 as described with reference to FIG. 2. The image controller 122, specifically the alpha-projection circuit 124, can be configured to perform process 300. Further, any computing device described herein can be configured to perform process 300, for example, computing system 2200. In step 302 of process 300, a first color volume in an red, green, blue (RGB) color cube based on a first projection solid. The projection solid may be a solid defined by a projection radius, e.g., a sphere, a rectangular prism, a tetrahedron, and/or any other shape. Examples of these projection solids can be seen in FIGS. 19, 20, and 21. The projection solid may be defined based on a projection origin color, where the projection radius is projected from.

In step 304, the pixels of the image that are within the first color volume are projected from their original color to a second color based on the first projection solid. The projection can be performed by generating a line from a projection color origin to the original color. The projection of the line that intersects a surface of the projection solid, a "projection surface" may define the second color. This is described in further detail with reference to FIG. 6.

In some implementations, the projection solid is a set of connected red, green, and blue (RGB) points. In this set of points, a straight line segment can be drawn between any point within the projection solid to any point within a background color set. The background color set may include the projection origin color and may be a subset of the connected RGB points of the projection solid. The set of connected RGB points of the projection solid may be a superset of the background color set. Further, said line segment may only include colors of the set of connected RGB points. In some implementations, the projection solid is a three dimensional solid such as a cube, a sphere, a rectangular prism, or a tetrahedron. The projection solid may be defined by a projection radius that extends from a projection origin color (e.g., white). The projection radius can define the projection volume and the projection surfaces of the projection solid.

The alpha-projection circuit 124 can be configured to select and/or adjust (replace) an alpha channel value for the projected pixels. The alpha-projection circuit 124 can be configured to determine the alpha channel value for the projected pixels by determining an alpha channel value that causes the second color, when alpha blended with a selected background color (e.g., white), the projection origin color, to be the original color.

As described herein, there may be an implicit reliance on the obvious analogy between a collection of discrete RGB points inside an axis-aligned rectangular prism and a real rectangular prism in continuous space. In said continuous space, it may be clear what the volume's "surface" is, and what it means to intersect that surface with a "ray."

There may be multiple ways of defining such a "projection." For example, defining a continuous surface separating RGB grid points that belong to the projected volume and those that do not. There are a number of techniques for doing so, such as the "marching cubes" meshing algorithm. After that is done, one can rely on definitions of ray-surface intersection in continuous spaces.

Another example can be discretizing the ray from one RGB point to another, such that the ray itself consists of RGB points. (The discretization can be done through any number of line-drawing algorithms known in computer graphics.) Then one can decide at which point along this discretized ray it intersects the "surface" of the projected volume. Again, there are many ways to do this, for example, the last point on the ray whose distance from the source is below some distance threshold, the last point on the ray to belong to the projected volume, etc.

Note that the projection surface for a given projected volume and projection source may be just the set of all points that can be output by the projection function for any inputs in the projected volume (except for the projection source, whose RGB projection is undefined but does not matter since it is always perfectly transparent).

In step 306, the alpha-projection circuit 124 can be configured to select alpha channel values for the projected pixels. The alpha-projection circuit 124 can be configured to determine an appropriate alpha channel value for each of the projected pixels by determining the alpha channel value that causes the second color to be blended with a projection origin color to be the original color. The projection origin color may be the color for which full transparency is desired. For this reason, any pixels of the image may be assigned full transparency if they are the projection origin color. In some implementations, the projection origin color is white or a light grey. However, the projection origin color can be any color.

Figure 4:
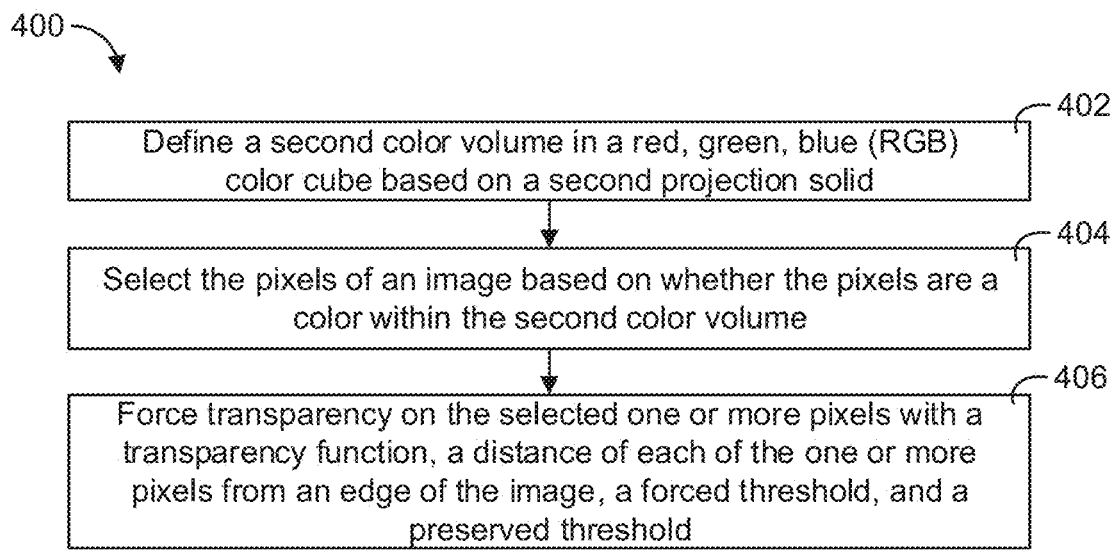
FIG. 4 is a flow chart of the process of forcing transparency on an image described in further detail according to an illustrative implementation.

Referring now to FIG. 4, a process 400 is shown illustrating the process of forcing transparency in greater detail, according to an illustrative implementation. Process 400 may be a process for performing step 206 of process 200 as described with reference to FIG. 2. The image controller 122, specifically the forced transparency circuit 126, can be configured to perform process 400. Further, any computing device described herein can be configured to perform process 400, for example, the computing system 2200 as described with reference to FIG. 22.

In step 402, the forced transparency circuit 126 can be configured to define a second color volume in a RGB color cube based on a second projection solid. The second color volume and/or the second projection solid may be the same as, or similar to, the first color volume and the first projection solid. In step 404, the forced transparency circuit 126 can be configured to select the pixels of the image (e.g., the image 132 and/or the alpha-projected image 136) that are within the second color volume.

In step 406, the forced transparency circuit 126 can be configured to adjust the alpha channel values of the selected pixels of the image. The transparency circuit 126 can be configured to use a transparency function to adjust the alpha channel values of the image. The transparency function may be one or more functions that define an output alpha channel value for each input alpha channel value of the selected pixels. The transparency function is illustrated graphically in FIG. 14. The transparency function may be one or more non-decreasing functions. The transparency function may further be one or more linear or non-linear functions. The transparency function may be defined by a forced threshold and a preserved threshold. The forced threshold and preserved threshold may be input alpha channel values. If an input alpha channel value of a selected pixel is below the forced threshold, a first transparency function may be applied to the pixel. If the input alpha channel value of a selected pixel is between the forced threshold and the preserved threshold, a second transparency function may be applied to the pixel. However, if the input alpha channel value of the selected alpha channel value is above the preserved threshold, the alpha channel value may not change at all.

The forced transparency function may use the distance of the selected pixels of the image from an edge of the image. The pixels that are closer to the edge of the image may be adjusted more aggressively than the pixels that are farther away from the edge of the image. This is defined by the multiple lines, the lines approach an identity transformation (i.e., the input equals the output at a particular distance from the edge of the image) shown in FIG. 14.

The transparency function may be one or more functions, e.g., the transparency function may be a piecewise function. The functions may be linear or non-linear, the functions may be of any order. The functions may be non-decreasing functions. For example, with respect to an input alpha channel value and a distance input, the function may output increasing alpha values for increasing alpha input values and increasing distance. Further, the output of the transparency functions may be between zero and the input alpha channel value.

The transparency function can be defined based on a preserved threshold and a forced threshold. The output of the transparency function may be based on the preserved threshold and the forced thresholds. The preserved threshold and forced threshold may define specific treatment of an input pixel alpha value based on whether the input alpha value is below the forced threshold, between the forced threshold and the preserved threshold, or greater than the preserved threshold. The preserved threshold may be an alpha channel value greater than the forced threshold. Further, if the input alpha channel value is between the forced threshold and the persevered threshold, the alpha channel value may be are adjusted to higher alpha channel values than input alpha channel values that are less than the forced threshold. Further, the transparency function may not adjust alpha channel values that are greater than the preserved threshold are not adjusted.

In some implementations, the transparency function is a piecewise linear function i.e., it is multiple linear transparency functions. The linear functions may apply to specific ranges of input alpha values. For example, a first linear function may be used to adjust alpha channel values for an input value ranging from zero the forced threshold. A second linear function may be applied to alpha channel values that are between the forced threshold and the preserved threshold.

Referring now to FIG. 5, content item 500 (e.g., a content item the same as and/or similar to the content item 112) with one or more of images 132 displayed over a background image 134 is displayed as a solid white color. Product images 502, 504, and 506 are displayed over the background image 134. FIG. 5 shows an example of a content unit with three illustrative images on white cards. The left image of FIG. 5, product image 506, is an image with a gray background of the type one might ideally want for all images. The middle image of FIG. 1, product image 502, is a white background image illustrating the first problem described above. The right image of FIG. 1, product image 504, is a non-rectangular image whose background is not perfectly white illustrating the second problem described above. Technically, both of the problems might be able to solve the problems without introducing transparency. One could do a static color remapping and add a bit more padding of the background color but a transparent background as offered by the methods described herein gives the freedom to experiment with multiple background gray shades without storing a lot of redundant files (which at the scale of many shopping websites can mean hundreds of TB of files per desired background).

Referring again to FIGS. 2, 3, and 4, the methods described herein can be implemented as a first stage method and a second stage method. The first stage being an alpha-projection stage (e.g., process 300) with the second stage being a stage for forcing transparency on an image (e.g., process 400). The first stage can depend on a single parameter, a "projection radius" in the range [1, 255], i.e., any channel value>0. In an RGB cube whose side length equals that radius and where the max corner is at white, all colors in that cube are projected away from white to one of the opposing cube faces. The three opposing cube faces can be collectively referred to as the projection surface, and the interior of that cube can be referred to as the projection volume, or otherwise a color volume.

Each RGB color in the color volume that is projected onto the projection surface can be assigned an alpha value such that when it is shown over a white background, alpha-blending results in roughly the original RGB color. FIGS. 6-11 illustrate the projection in just the red and green coordinates (e.g., in the plane where blue is maxed out) (e.g., green is on the z axis, R is on the y axis, and B could be on the x axis). However, it should be understood that the methods herein apply to a three dimensional RGB color cube and are not limited to two dimensional examples discussed herein.

Figure 6:
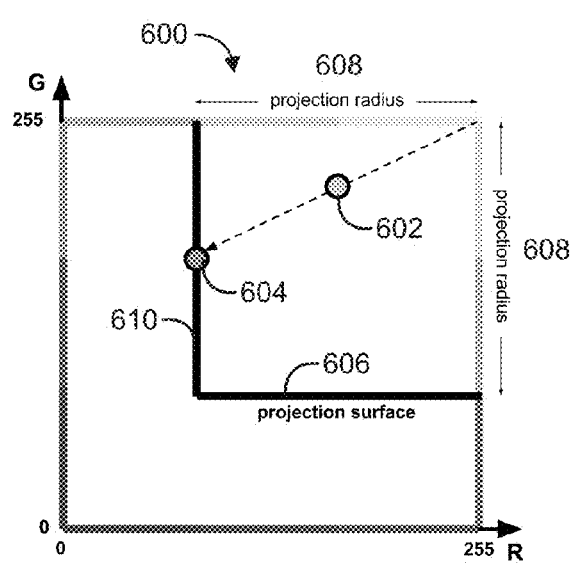
FIG. 6 is a chart illustrating alpha-projection for a pixel from an original color to a second color where the projection origin color is white, according to an illustrative implementation.

Referring to FIG. 6, chart 600 shows how a point on the cube interior would get projected away from white from its original color 602 to a second color 604 on the surface 606 of the first projection solid with alpha-projection, according to an illustrative implementation. In FIG. 6, a first color volume is defined by a first projection solid. In FIG. 6, the color volume and the projection solid are defined by a value for a projection radius 608. All colors that are within the first color volume defined by the projection solid and the projection radius may be projected onto a projection surface of the projection solid. Although only two projection surfaces 610 and 606 are labeled in FIG. 6 for green (projection surface 610) and blue (projection surface 606), it should be understood that there is a third projection surface for green.

Figure 7:
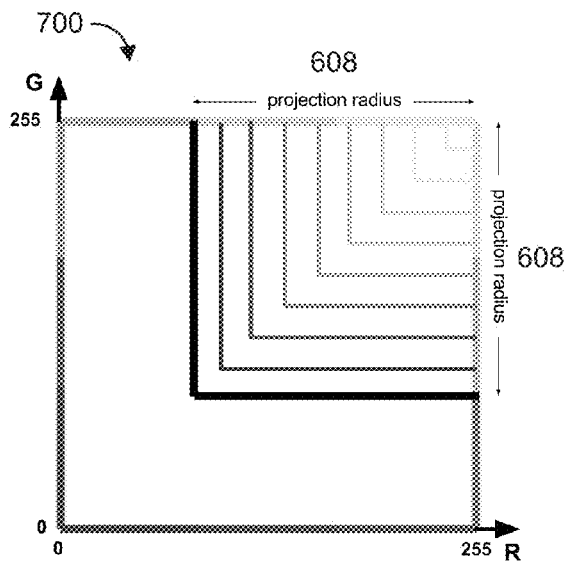
FIG. 7 is a chart illustrating adjusted alpha channel values for alpha-projection where the projection origin color is white according to an illustrative implementation.

Referring to FIG. 7, chart 700 shows lines of pre-projection points that can receive the same alpha channel value after projection, where whiter lines correspond to lower alpha channel values and blacker lines correspond to higher alpha channel values, according to an illustrative implementation. Note that the closer a color is to white, the projection origin color, in the cube, the lower the alpha value it may be assigned (i.e., the more transparent it becomes). At the extremes, all colors outside the projected first color volume stay at their original RGB values with an alpha channel value of 255, and white is remapped to a color with alpha channel value of 0. The RGB values to which white is projected may not matter visually since they may be fully transparent, but projecting to the opposite corner of the projection surface can be good for compression, all alpha channels can be set to 255 minus the projection radius, and every other projected RGB value can be guaranteed to have at least one channel with the same value.

Figure 8:
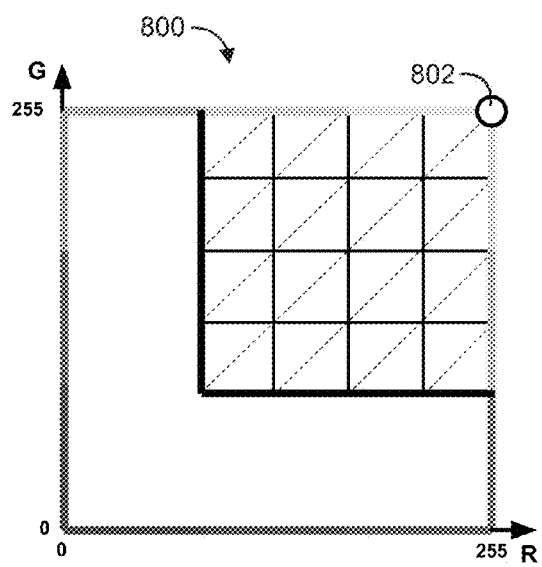
FIG. 8 is a chart illustrating a red, green, blue (RGB) color volume for alpha projection where the projection origin color is white according to an illustrative implementation.
Figure 9:
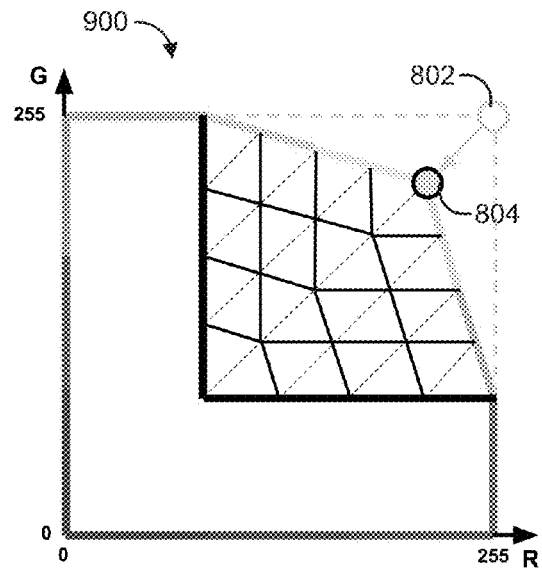
FIG. 9 is a chart illustrating a remapped color volume that results from alpha-blending an alpha-projected image with a new background color according to an illustrative implementation.

Referring now to FIGS. 8-9, charts 800 and 900 illustrate the color mapping of an alpha-projected image alpha blended with a background color is shown, according to an illustrative implementation. Projection origin color 802 may be the origin color used to alpha-project an image, it may be the color which receives full transparency. In FIG. 9, the mapped color 804 illustrates the color that the projection origin color 802 will be mapped to after alpha blending. As a result of this interpolated transparency, as the background color (e.g., the color of background image 134 if it is a solid color) is shifted away from white, the originally-white corner of the projected cube moves accordingly, and the volume of the projected cube is smoothly squished to accommodate the new white corner position, as illustrated in FIGS. 8-9.

Figure 10:
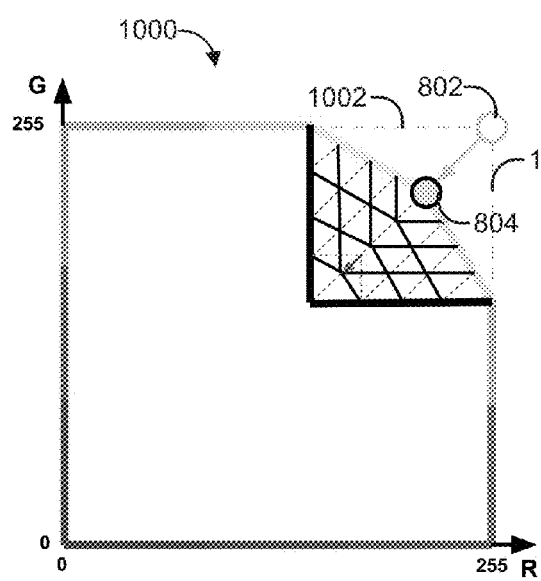
FIG. 10 is a chart illustrating a remapped color volume that results from alpha-blending an alpha-projected image with a new background color for alpha-projection with a first projection radius according to an illustrative implementation.
Figure 11:
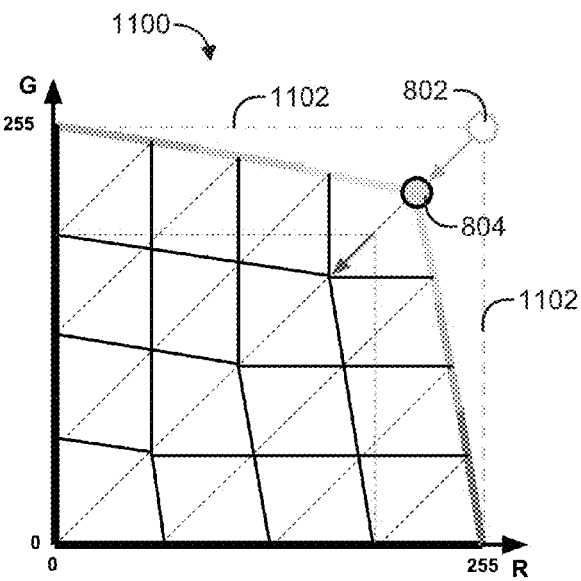
FIG. 11 is a chart illustrating a remapped color volume that results from alpha-blending an alpha-projected image with a new background color for color projection with a second projection radius according to an illustrative implementation.

Referring now to FIGS. 10-11, charts 1000 and 1100 illustrate color mapping results for an alpha-projected image alpha blended with a background image, the alpha-projected images being alpha-projected with different projection radiuses. In FIG. 10, the a first projection radius 1002 is used, a projection radius less than 255. In FIG. 11, the projection radius used is larger than in FIG. 10, it is 255. The choice of projection radius for the first projection solid lets one trade off color preservation and contrast preservation, which is illustrated schematically in FIGS. 10-11. As the viewport color gets darker, a smaller radius results in changes to fewer colors but a more exaggerated loss of contrast between projected colors (for a given shift of the white corner, a smaller projected cube will have to squish more). A larger radius will distribute any change in the white position over a wider swath of colors (and will thus better preserve contrast), but more colors will shift (obviously) and light colors will darken more dramatically (see the relative magnitudes of the interior arrows shown in red).

Figure 12:
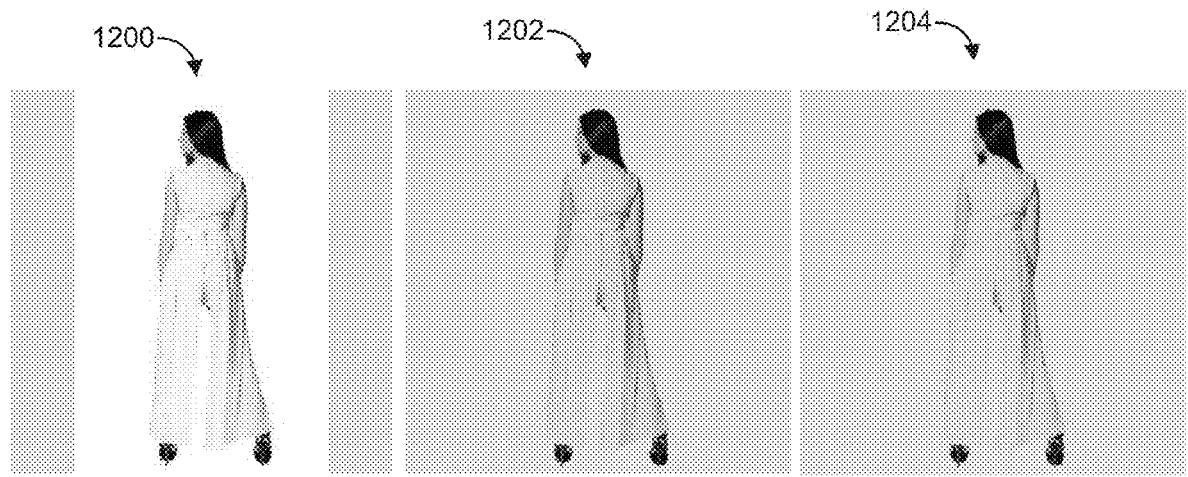
FIG. 12 is a set of images illustrating no alpha-projecting, alpha-projecting with a first projection radius, and alpha-projecting with a second projection radius according to an illustrative implementation.

Referring to FIG. 12, the images 1200, 1202, and 1204 illustrate the results of alpha-projection with different projection radii. In FIG. 12, the effect that a larger radius will distribute any change in the white position over a wider swath of colors but more colors will shift and light colors will darken more dramatically is shown according to an illustrative implementation. The original image is on the left, product image 1200, the middle image, product image 1202, was created with a projection radius of 40, and the right image, product image 1204, was created with a radius of 255. Note that the middle image does a better job of preserving color (the skin and the white top are noticeably darker in the right image than in either of the other two), but the right image does a better job of preserving the contrast in the original.

To support input images that already have transparent pixels, any input pixels with alpha<255 (the max) can be alpha-blended with a white background to create an opaque RGB color before applying the transformation above. Note that RGBA input pixels with high alpha can get mapped to RGB colors near white after this alpha-blending, and therefore end up with high alpha values after the alpha-white transformation.

If the aspect ratio of the image does not perfectly match that of the viewport, the image can be scaled so that its "overlong" axis fits exactly in the viewport, but the other axis will have to be padded with viewport pixels. If that happens and the padded edge may not be perfectly transparent (i.e. alpha 0), then a viewer will be able to see the transition between image and viewport pixels, breaking the illusion of a "full bleed" image. This effect is shown in the images of FIG. 13.

Figure 13:
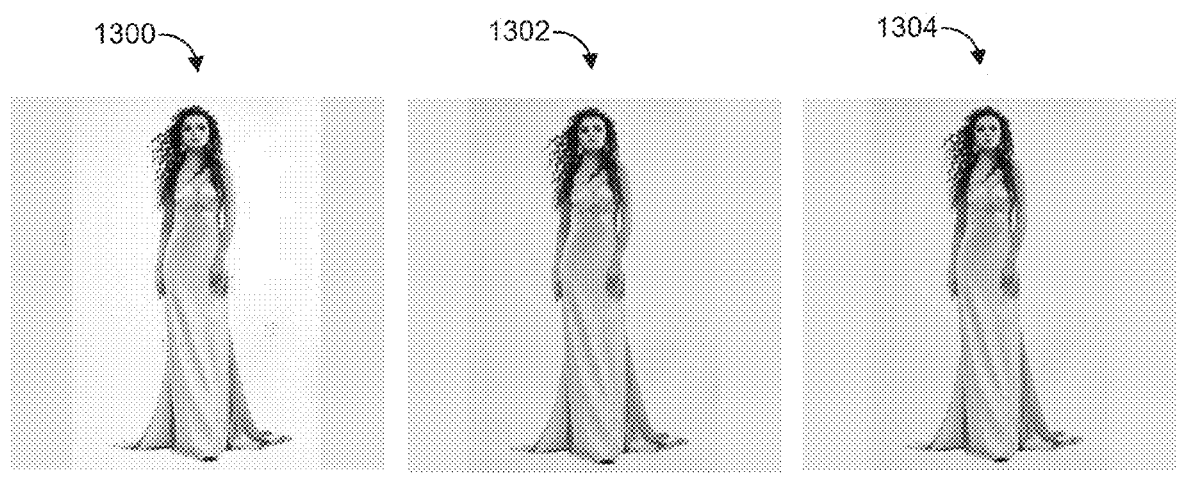
FIG. 13 is a set of images illustrating the results of padded-edge forced transparency according to an illustrative implementation.

Referring now to FIG. 13, product images 1300, 1302, and 1304 are shown to illustrate the effect of padded edges not being perfectly transparent according to an illustrative implementation. In FIG. 13, an original image, product image 1300, is shown with a white background on the left. The effect of just the alpha-projection with white as an origin point for the projection (alpha-white projection) is shown in the middle, product image 1302. For this reason, padded edge forced transparency as described with reference to processes 200 and 400 of FIGS. 2 and 4 can be performed and an example of the result is shown in the right side image, product image 1304.

Alpha channel values can be pushed more aggressively towards 0 near padded edges, resulting in an image like the one shown FIG. 13 on the right, product image 1304, which makes it less obvious where the image boundaries are. Not all pixels along the padded edges are forced to full transparency, since some high-alpha pixels might legitimately belong to foreground objects that should be preserved. Instead, a "transparent radius" (similar to the projection radius) that defines a second color volume of colors near a color original point (e.g., white) that should be forced to an alpha channel value of zero. The transparency forcing (process 400) can be implemented on an image as an alpha adjustment that happens after the alpha-white projection (process 300).

Figure 14:
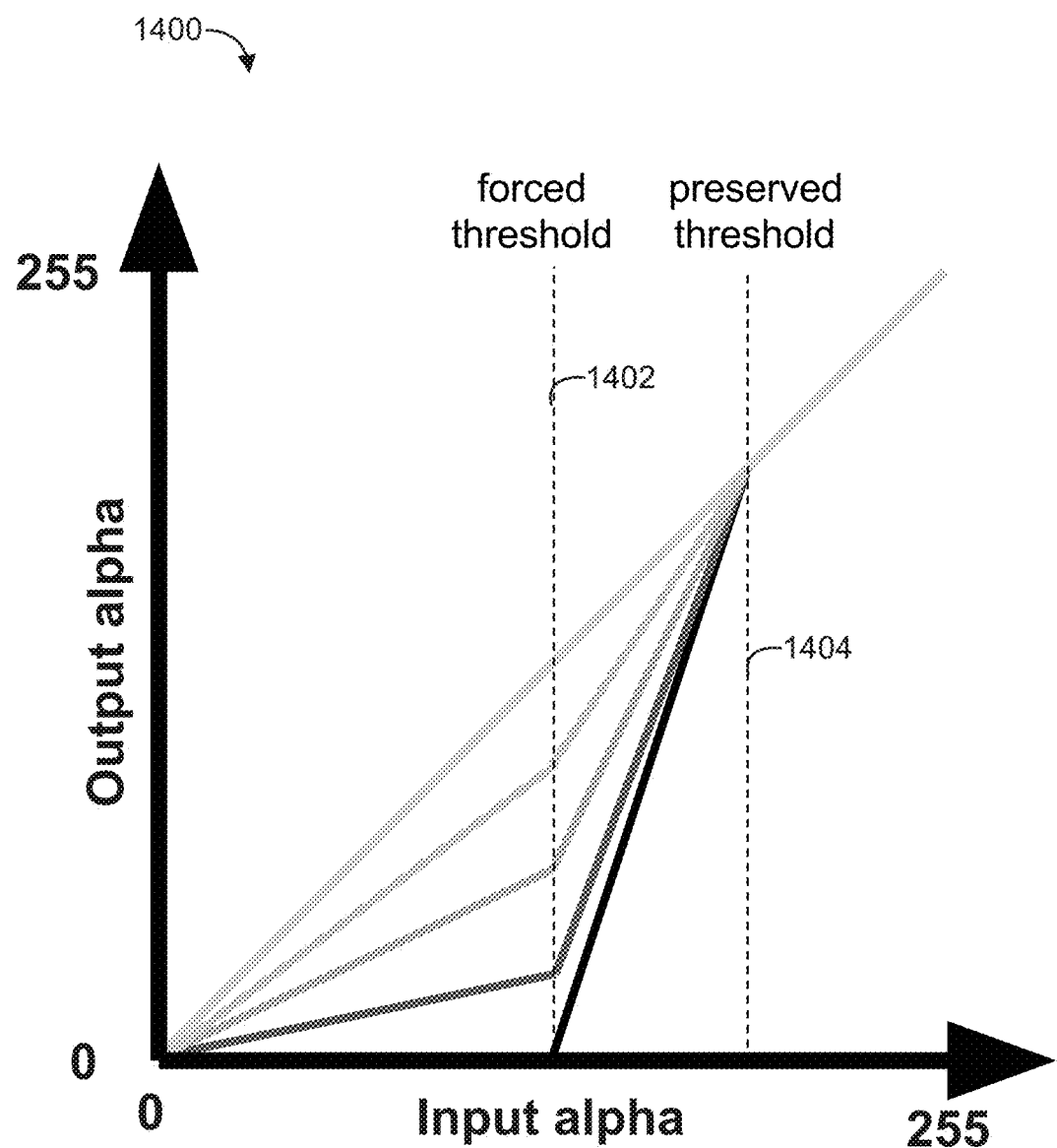
FIG. 14 is a chart illustrating a forced transparency function according to an illustrative implementation.

Referring to FIG. 14, the transparency function is described via chart 1400, according to an illustrative implementation. In chart 1400, the forced threshold 1402 and the preserved threshold 1404 are shown. All colors at the transparent radius can be assigned the same alpha by the projection, this can be referred to as the forced threshold 1402, since all alphas below that value are forced to zero along the long image edge. To avoid a sudden discontinuity in the opacity of colors, a second, higher threshold can be defined, the preserved threshold 1404, above which alpha values are unchanged, and then scale the alpha linearly between those two thresholds. The bottom (black) piecewise curve in the FIG. 14 illustrates this alpha transformation. As forced transparency moves away from the padded edge, the effect of the forced transparency can be scaled back by mapping the forced alpha threshold to higher and higher alphas. This is illustrated by the sequence of lighter and lighter curves in FIG. 14 ending in the identity transformation in the lightest gray.

The viewports used for shopping websites may be predominantly square, so in production, one can apply this transformation only to long edges on non-square images. (If viewports with a different aspect ratios were favored, one could transform the edge that is overlong relative to that aspect ratio.) The images may also be mostly large enough that only one axis requires padding, though if that were not the case one might apply this transformation on all four edges (though that can more frequently cause artifacts in cases where the subject intersects the short boundary, as is the case in the examples above where a model's face and legs are cut off by the image borders).

The forced transparency function illustrated in FIG. 14 may be piecewise linear, but other nonlinear functions can be used that may have similar effects. For example, at the padded edge, the function between the forced and preserved threshold can be any non-decreasing function that connects (Forced Threshold, 0) to (Preserved Threshold,Preserved Threshold). The point may transition smoothly between the input alphas that are forced to zero and those which are perfectly preserved. Further, at a distance d from the padded edge, the function from input to output alpha ($a_{out}=F(a_{in},d)$) can be function whose output is between 0 and $a_{in}$ and that is nondecreasing in both $a_{in}$ and d.

If too many pixels on the padded edge cannot be made transparent as described above, then the image may not look like a full-bleed image. So the transform can be set to fail if the fraction of alpha 0 padded-edge pixels is not higher than a threshold. Assuming a square viewport, it may matter less that a square image has perfectly transparent edge pixels, since the image will fill the viewport completely, there is no viewport padding that needs blending into. However, if there are very few/no near-white pixels on the square's edges, it may be better to not perform the alpha-white transform, the image itself provides the necessary contrast between the viewport and the white card on which it appears. For that reason, the method also can mark the transformation as a failure if too few pixels are near-white (for user-specified values of "too few" and "near white").

Referring generally to FIGS. 1-11, the methods described herein can be geared toward replacing white backgrounds, but variations on this same idea can be used to replace other colors and implement slightly different projection behaviors. White is one projection source that is illustrated in FIGS. 6-11, making it the color that gets mapped to perfect transparency, but this can be generalized to use another color for that purpose.

Instead of white, let the projection source (the projection origin color) be RGB point $s=(S_r, S_g, S_b)$. Let the projected volume be the set of all RGB points whose per-coordinate differences from s are all less than the projection radius (i.e., an $L_\infty$-ball). Note that this is the nonempty intersection of two cubes ($L_\infty$-ball around s and the RGB cube itself), so the resulting volume must be a rectangular prism. So its boundary comprises six rectangular faces.

For a given face F, if s does not appear on it, then it is clear what it means to project a point X onto F starting from s: the ray from s to x either intersects F at a single point, or not at all. But if s belongs to F, the projection is no longer uniquely defined for another X also on F, since the intersection of the aforementioned ray and F is a whole line segment of points. One may want to avoid this ambiguity, and also want to keep alpha assignments spatially consistent with between boundary points and interior points (all of the latter get projected to the prism faces to which does not belong). For both reasons, the projection surface may be limited to points on the boundary of the projected color volume that appear on at least one face where does not.

Note that alpha-white projection method (alpha-projecting with the source color being white) described herein may be one implementation of alpha-projection. If s is the white point, then the projected volume will be clipped so that three of its faces lie on the max faces of the RGB cube. Since the white point also lies on three of those projected volume faces, the projection surface consists of points on the other three faces. Also note that the projection and subsequent alpha-blending may behave slightly differently when s is on the interior or boundary of the RGB cube.

Figure 15:
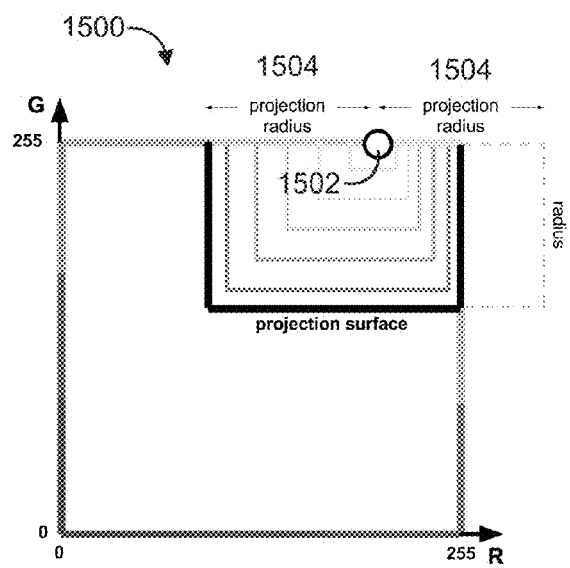
FIG. 15 is a chart illustrating alpha-projection with a non-white projection origin color, where the non-white color lies on the surface of the RGB color cube according to an illustrative implementation.
Figure 16:
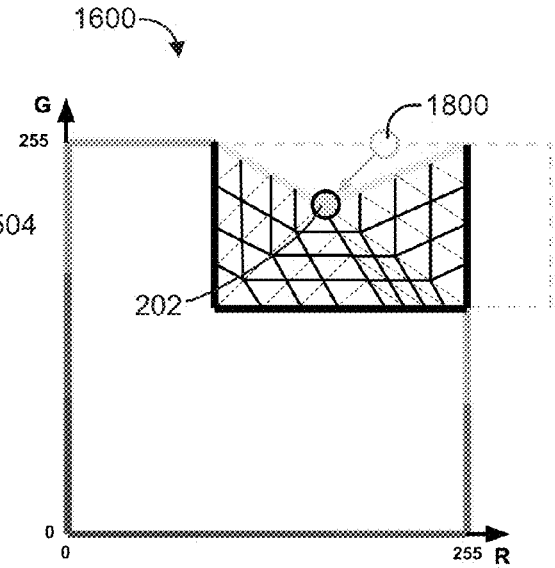
FIG. 16 is a chart illustrating a remapped color volume that results from alpha-blending an alpha-projected image with a new background color for alpha-projection with a non-white color projection origin color where the non-white color lies on the edge of the RGB color cube according to an illustrative implementation.

Referring now to FIGS. 15-16, charts 1500 and 1600 illustrate alpha-projection and alpha-blending with a non-white projection origin color that lies on the edge of the RGB cube according to an illustrative implementation. The projection origin color, s, marked by marker 1502, is shown to lie on the edge of a the RGB cube. A projection radius, marked by 1504, defines the projection solid, however, the projection solid is not entirely contained within the RGB cube. If s is on the boundary, then if the viewport color leaves that boundary, there will be some colors (including s itself) that will never be reconstructed by alpha-blending. (This is the reason why the alpha-projection with white as the projection origin color ensures that colors on the alpha-blended image boundary will not be white, so long as the viewport color is nonwhite.)

Figure 17:
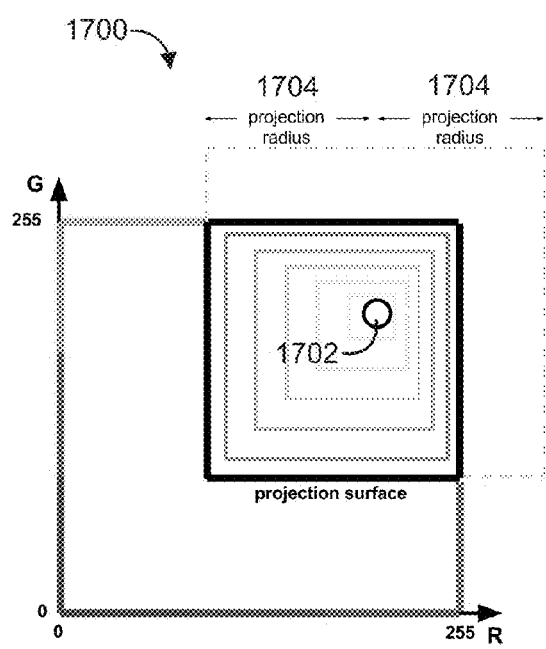
FIG. 17 is a chart illustrating alpha-projection for with a non-white projection origin color where the non-white color does not lie on the edge of the RGB color cube according to an illustrative implementation.
Figure 18:
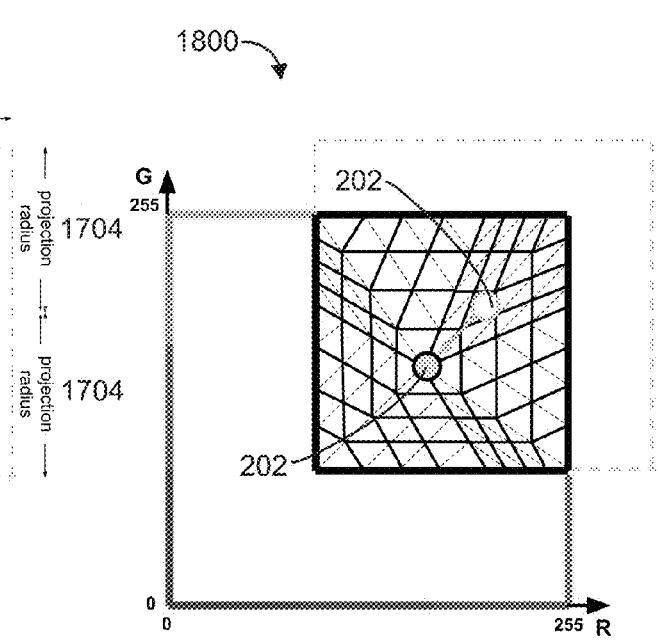
FIG. 18 is a chart illustrating a remapped color volume for alpha-blending an alpha-projected image with a new background color for alpha-projection with a non-white projection origin color where the non-white color does not lie on the edge of the RGB color cube according to an illustrative implementation.

Referring now to FIGS. 17-18, charts 1700 and 1800 illustrate alpha-projection and alpha-blending with a non-white projection origin color that lies within the RGB cube according to an illustrative implementation. The projection origin color, s, marked by marker 1702 is shown to lie within the RGB cube. Projection radius 1704 defines the projection solid, which, similar to FIGS. 15 and 16, is not entirely contained within the RGB cube. As shown in FIGS. 17-18, if the color is on the interior of the RGB cube, then projection and alpha-blending merely represent a redistribution of colors inside the projected volume. There are no colors that are guaranteed to be missing from the alpha-blended result. For that reason, if one choose a middling gray, for example, it cannot be guaranteed that that shade of gray won't appear on the boundary after alpha-blending (which might be a problem if one is computing this transformation to create contrast between the image and that particular shade of gray).

Figure 19:
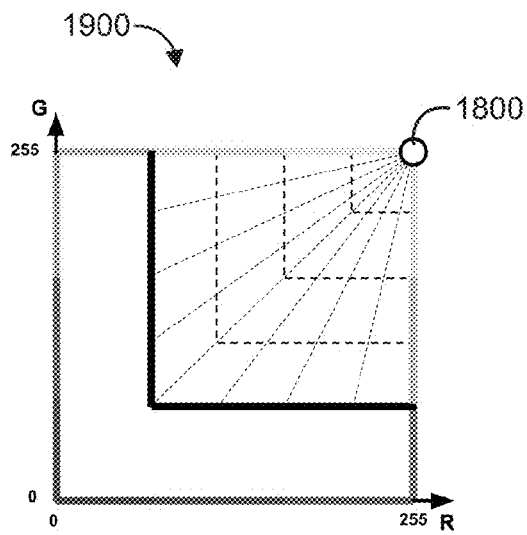
FIG. 19 is a chart illustrating alpha-projection with a rectangular prism as the projection solid according to an illustrative implementation.
Figure 20:
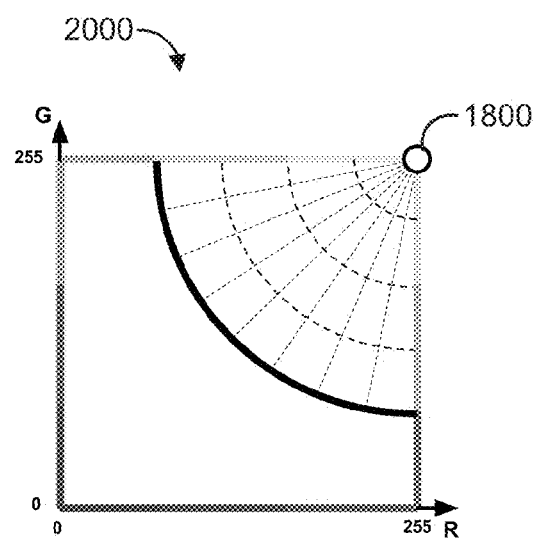
FIG. 20 is a chart illustrating color mapping with a sphere as the projection solid according to an illustrative implementation.
Figure 21:
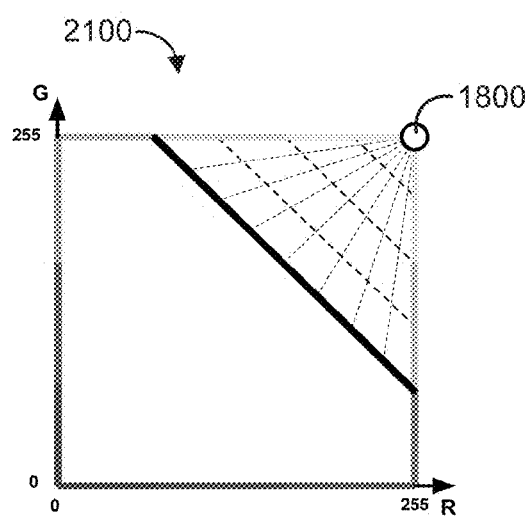
FIG. 21 is a chart illustrating color mapping with a tetrahedron as the projection solid according to an illustrative implementation.

Referring now to FIGS. 19-21, charts 1900, 2000, and 2100 illustrate three different projection solids, according to an illustrative implementation. In FIG. 19, the projection solid is a cube. In FIG. 20, the projection solid is a sphere while in FIG. 21 the projection solid is a tetrahedron. The projection surface, as defined herein, may have beneficial properties. The points in RGB space can belong to that surface. For an integer projection radius, an RGB point may be unambiguously in the interior of the projected volume, on the projection surface, or outside the projected volume (depending on whether the largest single-channel difference from S is less than, equal to, or greater than the projection radius, respectively). The projection of any RGB point away from white onto that surface can be defined. Technically, in discrete RGB-space that "surface" may be a collection of discrete points, but even without delving into details of discrete topology, an intuitive continuous surface that connects those points can be defined. Any RGB point can then be projected onto it, and remapped to the nearest discrete point.

For viewport colors near white/not too close to the projection surface, two pixels cannot alpha-blend to the same color unless they were of very similar color in the original image. This may be a consequence of the fact that the whole projection surface is "visible" (not self-occluding) from both white and every viewport color of interest. If one point on the surface could block the viewport color's view of another (distant) point on the surface, that would mean that those three points would be roughly colinear, and alpha-blending (which is a linear interpolation) could map those distant surface points onto the same color for certain pairs of alphas.

That said, the $L_\infty$-sphere projection surface used herein may not be unique in having these properties. To illustrate the variety of potential surfaces, FIGS. 19-21 illustrate "spheres" around white, where a "sphere" refers to the set of points at the same distance from white using a different L-norm to define the distance in each case: $L_\infty$ (FIG. 19), $L_2$ (FIG. 20), and $L_1$ (FIG. 21). Projection surfaces are not limited to these spheres, either. There are any number of connected RGB point sets containing the source that could also be used as the projected volume.

Again, note that the alpha-white algorithm first described is a special case of this general algorithm, in which the projection source is white, the projected volume is the intersection of an $L_\infty$-ball with the RGB cube, and projection is done in Euclidean 3D space before snapping to a nearby RGB grid point.

As an example, a projection solid can be defined by letting B be a set of colors one would potentially want to use as a new background color, which should include the projection origin color. A valid projection solid V (which can be a superset of B) can be any set of connected RGB points such that one can draw a straight line segment between any point v in V and any point b in B, and that line segment consists entirely of points in V. For any such solid, it is possible to clearly define a projection operation away from the projection source, and the alpha-blending of the resulting image with any background color in B will be well-behaved. What a "straight line" means in a discretized color space and how the projection operation can be defined is discussed in further detail below.

Figure 22:
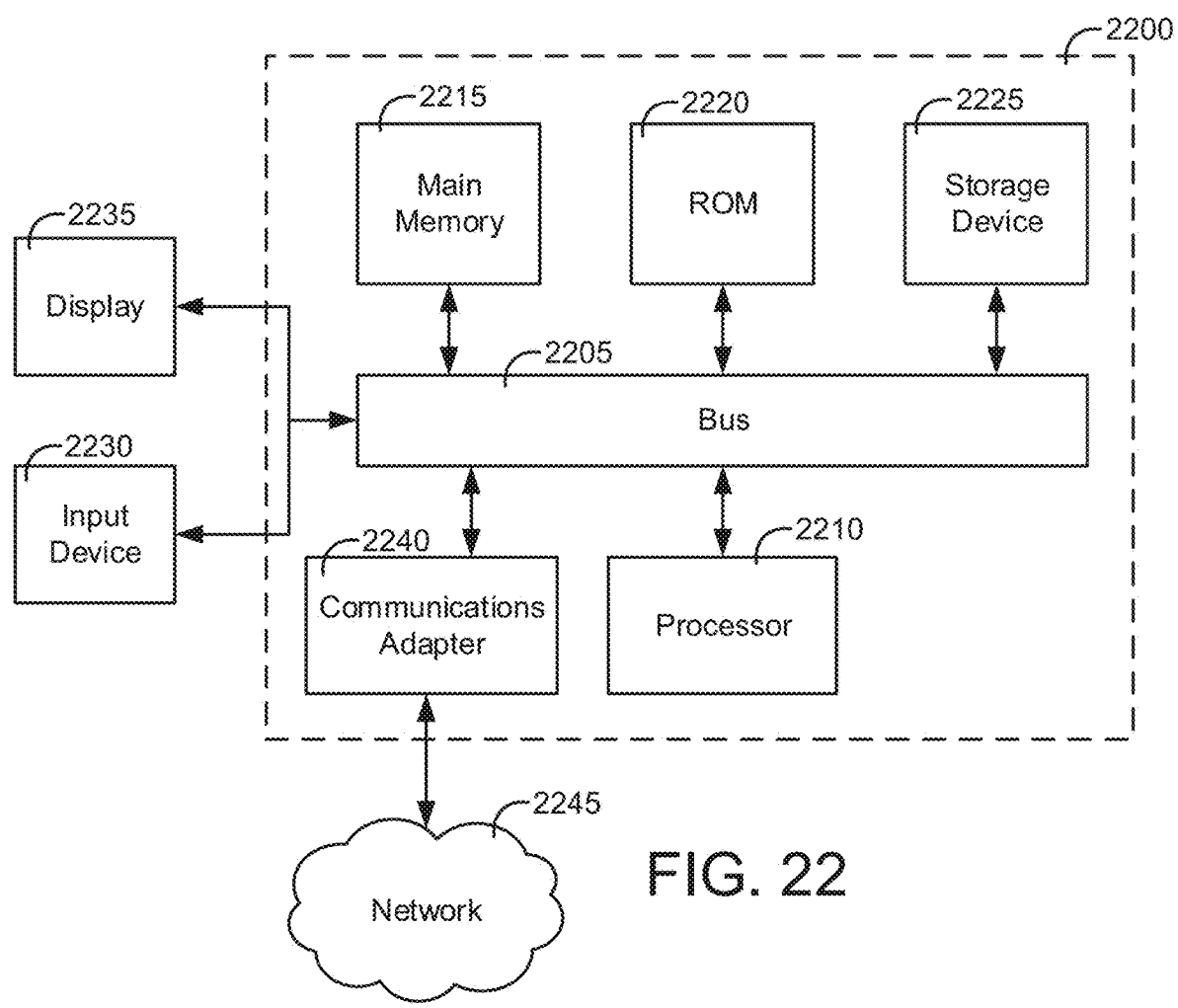
FIG. 22 is a block diagram of a computing system according to an illustrative implementation.

FIG. 22 illustrates a depiction of a computer system 2200 that can be used, for example, to implement the systems and methods described herein. For example, to implement an illustrative user device, an illustrative content management system, an illustrative content provider device, an illustrative analysis system, and/or various other illustrative systems described in the present disclosure. The computing system 2200 includes a bus 2205 or other communication component for communicating information and a processor 2210 coupled to the bus 2205 for processing information. The computing system 2200 also includes main memory 2215, such as a random access memory (RAM) or other dynamic storage device, coupled to the bus 2205 for storing information, and instructions to be executed by the processor 2210. Main memory 2215 can also be used for storing position information, temporary variables, or other intermediate information during execution of instructions by the processor 2210. The computing system 2200 may further include a read only memory (ROM) 2210 or other static storage device coupled to the bus 2205 for storing static information and instructions for the processor 2210. A storage device 2225, such as a solid state device, magnetic disk or optical disk, is coupled to the bus 2205 for persistently storing information and instructions.

The computing system 2200 may be coupled via the bus 2205 to a display 2235, such as a liquid crystal display, or active matrix display, for displaying information to a user. An input device 2230, such as a keyboard including alphanumeric and other keys, may be coupled to the bus 2205 for communicating information, and command selections to the processor 2210. In another implementation, the input device 2230 has a touch screen display 2235. The input device 2230 can include a cursor control, such as a mouse, a trackball, or cursor direction keys, for communicating direction information and command selections to the processor 2210 and for controlling cursor movement on the display 2235.

In some implementations, the computing system 2200 may include a communications adapter 2240, such as a networking adapter. Communications adapter 2240 may be coupled to bus 2205 and may be configured to enable communications with a computing or communications network 2245 and/or other computing systems. In various illustrative implementations, any type of networking configuration may be achieved using communications adapter 2240, such as wired (e.g., via Ethernet), wireless (e.g., via WiFi, Bluetooth, etc.), pre-configured, ad-hoc, LAN, WAN, etc.

According to various implementations, the processes that effectuate illustrative implementations that are described herein can be achieved by the computing system 2200 in response to the processor 2210 executing an arrangement of instructions contained in main memory 2215. Such instructions can be read into main memory 2215 from another computer-readable medium, such as the storage device 2225. Execution of the arrangement of instructions contained in main memory 2215 causes the computing system 2200 to perform the illustrative processes described herein.

One or more processors in a multi-processing arrangement may also be employed to execute the instructions contained in main memory 2215. In alternative implementations, hard-wired circuitry may be used in place of or in combination with software instructions to implement illustrative implementations. Thus, implementations are not limited to any specific combination of hardware circuitry and software.

Although an example processing system has been described in FIG. 22, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving an image from a system storing one or more images;
   receiving a projection solid parameter defining a projection solid within a color cube wherein the projection solid defines contrast of one or more objects of the image when the image is displayed as a foreground image over a background image;
   alpha-projecting the image to assign alpha channel values to one or more pixels of the image by:
      projecting the one or more pixels of the image from an original color to a second color on a surface of the projection solid; and
      setting the alpha channel values for the one or more pixels by determining a particular alpha channel value that causes each second color alpha blended with a projection origin color to be the original color; and
   displaying the alpha-projected image as the foreground image over the background image.

2. The method of claim 1, wherein the projection solid is a set of connected red, green, and blue (RGB) points wherein a straight line segment can be drawn between any first point within the projection solid to any second point within a background color set, wherein the straight line segment comprises one or more of the set of connected RGB points, wherein the background color set comprises the projection origin color and is a subset of the connected RGB points of the projection solid, wherein the set of connected RGB points of the projection solid are a superset comprising the background color set.

3. The method of claim 2, wherein the projection solid is a three dimensional shape and is at least one of a cube, a sphere, a rectangular prism, or a tetrahedron; and
   wherein the projection origin color is white, wherein any pixel of the image that is white, when alpha-projected is assigned an alpha channel value of full transparency.

4. The method of claim 1, wherein the projection solid parameter is a projection radius, wherein projecting each of the one or more pixels from the original color to the second color is based on the projection radius and comprises:
   defining a first color volume of the color cube based on the projection solid comprising one or more projection surfaces, wherein the one or more projection surfaces comprise the surface, wherein the color cube is a red, green, blue (RGB) color cube; and
   projecting original colors of the one or more pixels of the image that are a first color within the first color volume from the original color to the second color of the surfaces.

5. The method of claim 4, wherein the one or more projection surfaces of the projection solid are defined by the projection radius extending from the projection origin color.

6. The method of claim 1, further comprising forcing transparency on the alpha-projected image by:
   selecting pixels of the alpha-projected image to force transparency; and
   adjusting the alpha channel values for the selected pixels based on a transparency function by:
      adjusting the alpha channel values for the selected pixels based on the transparency function, an input alpha channel values for the selected pixels, and a distance of each of the selected pixels from an edge of the image.

7. The method of claim 6, wherein the transparency function is one or more non-decreasing functions that are non-decreasing with respect to the input alpha channel values and the distance of each of the selected pixels from the edge of the image, wherein the one or more non-decreasing functions are based on the distance of each selected pixel of the alpha-projected image to the edge of the alpha-projected image, wherein an output of the transparency function is between zero and a particular input alpha channel value.

8. The method of claim 6, wherein adjusting the alpha channel values for the selected pixels is further based on a forced threshold and a preserved threshold for the input alpha channel values, wherein:
   the preserved threshold is a value greater than the forced threshold;
   the input alpha channel values that are between the forced threshold and the persevered threshold are adjusted to higher alpha channel values than the input alpha channel values that are less than the forced threshold; and
   the alpha channel values that are greater than the preserved threshold are not adjusted.

9. The method of claim 6, wherein the transparency function comprises a first linear function and a second linear function, wherein adjusting the alpha channel values for the selected pixels comprises:

adjusting the alpha channel values for the selected pixels based on the first linear function for first input alpha channel values ranging from zero to a forced threshold, wherein the first input alpha channel values are the alpha channel values of the selected pixels before the alpha channel values of the selected pixels are adjusted; and adjusting the alpha channel values for the selected pixels based on the second linear function for second input alpha channel values ranging from the forced threshold to a preserved threshold.

10. The method of claim 6, wherein selecting the pixels of the alpha-projected image comprises:

defining a second color volume of a red, green, blue (RGB) cube based on a second projection solid; and selecting the pixels of the alpha-projected image that have a color within the second color volume.

11. The method of claim 1, wherein the color cube comprises a first set of colors and a second set of colors, wherein the projection solid comprises the first set of colors.

12. A system comprising at least one computing device operably coupled to at least one memory and configured to:

receive an image from a system storing one or more images;

receive a projection solid parameter defining a projection solid within a color cube wherein the projection solid defines contrast of one or more objects of the image when the image is displayed as a foreground image over a background image;

alpha-project the image to assign alpha channel values to one or more pixels of the image by:

projecting the one or more pixels of the image from an original color to a second color on a surface of the projection solid; and setting the alpha channel values for the one or more pixels by determining a particular alpha channel value that causes each second color alpha blended with a projection origin color to be the original color; and display the alpha-projected image as the foreground image over the background image.

13. The system of claim 12, wherein the projection solid is a set of connected red, green, and blue (RGB) points wherein a straight line segment can be drawn between any first point within the projection solid to any second point within a background color set, wherein the straight line segment comprises only or more of the set of connected RGB points, wherein the background color set comprises the projection origin color and is a subset of the connected RGB points of the projection solid, wherein the set of connected RGB points of the projection solid are a superset comprising the background color set.

14. The system of claim 13, wherein the projection solid is a three dimensional shape and is at least one of a cube, a sphere, a rectangular prism, or a tetrahedron; and wherein the projection origin color is white, wherein any pixel of the image that is white, when alpha-projected is assigned an alpha channel value of full transparency.

15. The system of claim 12, wherein the projection solid parameter is a projection radius, wherein the at least one computing device is configured to project each of the one or more pixels from the original color to the second color based on the projection radius and by:

defining a first color volume of the color cube based the projection solid comprising one or more projection surfaces, wherein the one or more projection surfaces comprise the surface, wherein the color cube is a red, green, blue (RGB) color cube; and projecting original colors of the one or more pixels of the image that are a first color within the first color volume from the original color to the second color of the surface, wherein the one or more projection surfaces of the projection solid are defined by the projection radius extending from the projection origin color.

16. The system of claim 12, wherein the at least one computing device is configured to force transparency on the alpha-projected image by:

selecting pixels of the alpha-projected image to force transparency; and adjusting the alpha channel values for the selected pixels based on a transparency function by:

adjusting the alpha channel values for the selected pixels based on the transparency function, an input alpha channel values for the selected pixels, and a distance of each of the selected pixels from an edge of the image.

17. The system of claim 16, wherein the transparency function is one or more non-decreasing functions that are non-decreasing with respect to the input alpha channel values and the distance of each of the selected pixels from the edge of the image, wherein the one or more non-decreasing functions are based on the distance of each selected pixel of the alpha-projected image to the edge of the alpha-projected image, wherein an output of the transparency function is between zero and a particular input alpha channel value.

18. The system of claim 16, wherein adjusting the alpha channel values for the selected pixels is further based on a forced threshold and a preserved threshold for the input alpha channel values, wherein:

the preserved threshold is a value greater than the forced threshold;

the input alpha channel values that are between the forced threshold and the persevered threshold are adjusted to higher alpha channel values than the input alpha channel values that are less than the forced threshold; and the alpha channel values that are greater than the preserved threshold are not adjusted.

19. The system of claim 16, wherein the transparency function comprises a first linear function and a second linear function, wherein adjusting the alpha channel values for the selected pixels comprises:

adjusting the alpha channel values for the selected pixels based on the first linear function for first input alpha channel values ranging from zero to a forced threshold, wherein the first input alpha channel values are the alpha channel values of the selected pixels before the alpha channel values of the selected pixels are adjusted; and adjusting the alpha channel values for the selected pixels based on the second linear function for second input alpha channel values ranging from the forced threshold to a preserved threshold.

20. One or more non-transitory computer-readable storage media having instructions stored thereon that, when executed by at least one processor, cause the at least one processor to perform operations comprising:

receiving an image from a system storing one or more images;

receiving a projection solid parameter defining a projection solid within a color cube wherein the projection solid defines contrast of one or more objects of the image when the image is displayed as a foreground image over a background image;
alpha-projecting the image to assign alpha channel values to one or more pixels of the image by:
projecting the one or more pixels of the image from an original color to a second color on a surface of the projection solid; and
setting the alpha channel values for the one or more pixels by determining a particular alpha channel value that causes each second color alpha blended with a projection origin color to be the original color;
forcing transparency on the alpha-projected image by:
selecting pixels of the alpha-projected image to force transparency; and
adjusting the alpha channel values for the selected pixels based on a transparency function by:
adjusting the alpha channel values for the selected pixels based on the transparency function, an input alpha channel values for the selected pixels, and a distance of each of the selected pixels from an edge of the image; and
displaying the alpha-projected image as the foreground image over the background image.

\* \* \* \* \*